(12) United States Patent
Fan et al.

(10) Patent No.: US 9,885,489 B2
(45) Date of Patent: Feb. 6, 2018

(54) HVAC SYSTEMS

(75) Inventors: Junqiang Fan, Glastonbury, CT (US); Stevo Mijanovic, South Windsor, CT (US); Lishan Wang, Shanghai (CN)

(73) Assignee: CARRIER CORPORATION, Farmington, CT (US)

( * ) Notice: Subject to any disclaimer, the term of this patent is extended or adjusted under 35 U.S.C. 154(b) by 855 days.

(21) Appl. No.: 14/235,499

(22) PCT Filed: Jul. 26, 2012

(86) PCT No.: PCT/US2012/048274
§ 371 (c)(1),
(2), (4) Date: Jan. 28, 2014

(87) PCT Pub. No.: WO2013/019537
PCT Pub. Date: Feb. 7, 2013

(65) Prior Publication Data
US 2014/0158783 A1    Jun. 12, 2014

Related U.S. Application Data

(60) Provisional application No. 61/513,532, filed on Jul. 29, 2011.

(51) Int. Cl.
*F24F 11/00* (2006.01)
*F24D 19/10* (2006.01)
(Continued)

(52) U.S. Cl.
CPC ........ *F24F 11/006* (2013.01); *F24D 19/1039* (2013.01); *F24D 19/1087* (2013.01);
(Continued)

(58) Field of Classification Search
CPC ....... F24F 2001/0077; F24F 2001/0074; F24F 11/008; F24F 2011/0083
See application file for complete search history.

(56) References Cited

U.S. PATENT DOCUMENTS 4,034,801 A    7/1977    Bernstein
4,916,909 A    4/1990    Mathur et al.
(Continued)

FOREIGN PATENT DOCUMENTS

CN    1111747 A    11/1995
CN    1121165 A    4/1996
(Continued)

OTHER PUBLICATIONS

Chinese First Office Action for application CN 201280038259.4, dated May 28, 2015, 7 pages.
(Continued)

*Primary Examiner* — Ljiljana Ciric
*Assistant Examiner* — Alexis Cox
(74) *Attorney, Agent, or Firm* — Cantor Colburn LLP

(57) ABSTRACT

A system includes a heat pump configured to match a working heat transfer fluid temperature to a fluid temperature set-point, a fluid pump in fluid communication with the heat pump through the heat transfer fluid and configured to match the heat transfer fluid pressure/flow to a fluid pressure/flow set-point, at least one heat exchanger in fluid communication with the fluid pump, and a supervisory controller in signal communication with the at least one heat exchanger, the fluid pump, and the heat pump. The at least one heat exchanger includes a proportional valve and a return air temperature gauge configured to monitor return air temperature associated therewith. The supervisory controller is configured to vary the fluid temperature set-point and vary the fluid pressure/flow set-point based upon a position of the proportional valve and the return air temperature.

9 Claims, 5 Drawing Sheets

(51) Int. Cl.
*G05D 23/19* (2006.01)
*F25B 41/04* (2006.01)

(52) U.S. Cl.
CPC ............ *F24F 11/008* (2013.01); *F25B 41/04* (2013.01); *G05D 23/19* (2013.01); *F24F 11/0012* (2013.01)

(56) References Cited

U.S. PATENT DOCUMENTS

| | | | |
|---|---|---|---|
| 4,926,649 A | 5/1990 | Martinez, Jr. | |
| 5,544,809 A | 8/1996 | Keating et al. | |
| 5,573,181 A | 11/1996 | Ahmed | |
| 5,628,201 A * | 5/1997 | Bahel | F24F 11/0076 62/211 |
| 5,860,286 A | 1/1999 | Tulpule | |
| 5,963,458 A * | 10/1999 | Cascia | F25B 49/02 165/200 |
| 6,666,042 B1 * | 12/2003 | Cline | F24F 3/065 62/175 |
| 6,766,651 B2 | 7/2004 | Dillenback | |
| 7,036,330 B2 | 5/2006 | Grabon et al. | |
| 7,076,961 B2 | 7/2006 | Takusagawa | |
| 7,349,824 B2 | 3/2008 | Seigel | |
| 7,643,908 B2 | 1/2010 | Quirino et al. | |
| 7,720,635 B2 | 5/2010 | Donath et al. | |
| 7,847,681 B2 | 12/2010 | Singhal et al. | |
| 9,297,548 B2 * | 3/2016 | Mijanovic | B60H 1/00885 |
| 2002/0053214 A1 * | 5/2002 | Melendez-Gonzalez | F24F 5/0046 62/235.1 |
| 2003/0041608 A1 * | 3/2003 | Gonzalez-Cruz | F25B 27/007 62/235.1 |
| 2006/0005554 A1 * | 1/2006 | Okada | F24F 11/008 62/183 |
| 2006/0123810 A1 | 6/2006 | Ha et al. | |
| 2007/0181701 A1 * | 8/2007 | Cheng | F24F 3/0442 236/49.3 |
| 2008/0264086 A1 * | 10/2008 | Liu | F24F 11/0079 62/180 |
| 2009/0012650 A1 | 1/2009 | Wang et al. | |
| 2009/0065598 A1 | 3/2009 | Quirino et al. | |
| 2009/0171512 A1 * | 7/2009 | Duncan | F24F 5/0035 700/300 |
| 2009/0182456 A1 | 7/2009 | Liao et al. | |
| 2010/0057258 A1 | 3/2010 | Clanin | |
| 2010/0106331 A1 | 4/2010 | Li et al. | |
| 2010/0211224 A1 | 8/2010 | Keeling et al. | |
| 2011/0077779 A1 | 3/2011 | Fuller et al. | |
| 2011/0107781 A1 * | 5/2011 | Kinugasa | F24F 11/008 62/157 |
| 2011/0144811 A1 * | 6/2011 | Liu | F24F 11/008 700/276 |
| 2012/0192955 A1 * | 8/2012 | Dazai | F24F 3/044 137/2 |

FOREIGN PATENT DOCUMENTS

| | | |
|---|---|---|
| CN | 101529171 A | 9/2009 |
| CN | 201731568 U | 2/2011 |
| DE | 102005050666 A1 | 10/2005 |
| EP | 1091178 A2 | 4/2001 |
| JP | 2006125789 A | 5/2006 |
| WO | WO2010088893 A1 | 8/2010 |

OTHER PUBLICATIONS

PCT International Preliminary Report on Patentability and Written Opinion of the International Searching Authority for International Application No. PCT/US2012/048274, dated Feb. 13, 2014, 8 pages.
PCT International Preliminary Report and Written Opinion for Int'l Application No. PCT/US2012/048274, Int'l filing date: Jul. 26, 2012; dated Feb. 13, 2014, 8 pgs.
PCT International Search Report for International application No. PCT/US2012/048274; International Filing Date: Jul. 26, 2012; dated Aug. 1, 2013; 4 pgs.
PCT Written Opinion for International Application No. PCT/US2012/048274; International Filing Date: Jul. 26, 2012; dated Aug. 1, 2013; 6 pgs.

* cited by examiner

＃ HVAC SYSTEMS

BACKGROUND OF THE INVENTION

Generally, a conventional heating, ventilating, and air conditioning (HVAC) system utilizes predetermined and/or fixed set-points for control of heat pump and fluid pump operations, while relying on local fan-coil unit controllers for localized control. For example, FIG. 1 illustrates a conventional HVAC system. As illustrated, the system 100 includes a heat pump 101, fluid pump 102, three-way valve 103, and a plurality of fan-coil units (FCUs) 120. Each fan coil unit may include a proportional valve 104 and variable speed fan-coil heat exchanger 105. In the HVAC system 100, a heat transfer fluid may flow through each component to provide cooling or heating according to well-known manners. The heat transfer fluid may be any suitable heat transfer fluid or refrigerant, including water.

The heat pump 101 provides heating or cooling according to a predetermined or user-defined fixed-value of leaving water temperature (LWT). The heat pump adjusts cooling capacity based on entering water temperature (EWT) and LWT in order to maintain the associated LWT. The water pump 102 controls water flow based on pressure drop across the fan-coil units 120. The three-way valve 103 by-passes surplus water flow to maintain minimum water flow required by heat pump 101. In system 100, the valve position and the fan speed of each FCU may be used for controlling a different conditioned space's temperature.

In conventional implementations, the fixed LWT and pressure set-points of HVAC systems result in short-comings which include capacity which may not fully and quickly match an actual load. Thus, HVAC systems are not operated in the most energy efficient condition. Further, in HVAC systems where set-points are assumed to be varied based on steady-state load conditions, power consumption changes associated with equipment wear and equipment variances are not adequately considered. Moreover, even if a LWT set-point is routinely reset based on ambient temperature, internal load changes are not considered on the fly.

BRIEF DESCRIPTION OF THE INVENTION

According to an exemplary embodiment of the present invention, a system includes a heat pump configured to match a heat transfer fluid temperature to a fluid temperature set-point, a fluid pump in fluid communication with the heat pump through the heat transfer fluid and configured to match the heat transfer fluid pressure to a fluid pressure set-point, at least one heat exchanger in fluid communication with the fluid pump, and a supervisory controller in signal communication with the at least one heat exchanger, the fluid pump, and the heat pump. The at least one heat exchanger includes a proportional valve and a return air temperature gauge configured to monitor return air temperature associated therewith. The supervisory controller is configured to vary the fluid temperature set-point and vary the fluid pressure set-point based upon a position of the proportional valve and the return air temperature.

According to another exemplary embodiment of the present invention, a method of HVAC system control includes monitoring valve positions of proportional valves associated with individual heat exchangers of the HVAC system, monitoring return air temperatures associated with the individual heat exchangers of the HVAC system, determining a new fluid pressure set-point and a new fluid temperature pressure set-point for the HVAC system based upon the monitoring, and providing the new fluid pressure set-point and the new fluid temperature set-point to the HVAC system.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

As disclosed herein, exemplary embodiments of the present invention provide a control method for providing changes to preconfigured set-points of a HVAC system. According to exemplary embodiments, LWT set-points for a heat pump and delta pressure (DP) set-points of a fluid pump are altered in real-time based on temperature and valve position feedback from local FCU controllers of the HVAC system.

For example, according to exemplary embodiments, an HVAC system's load is estimated based on the local FCU controller information such that proper floating set-points for LWT and DP can be calculated to ensure a required capacity may be generated to relatively quickly match the HVAC system's load. The technical benefits of exemplary embodiments include energy savings throughout both cooling and heating cycles of an entire HVAC system.

Figure 1:
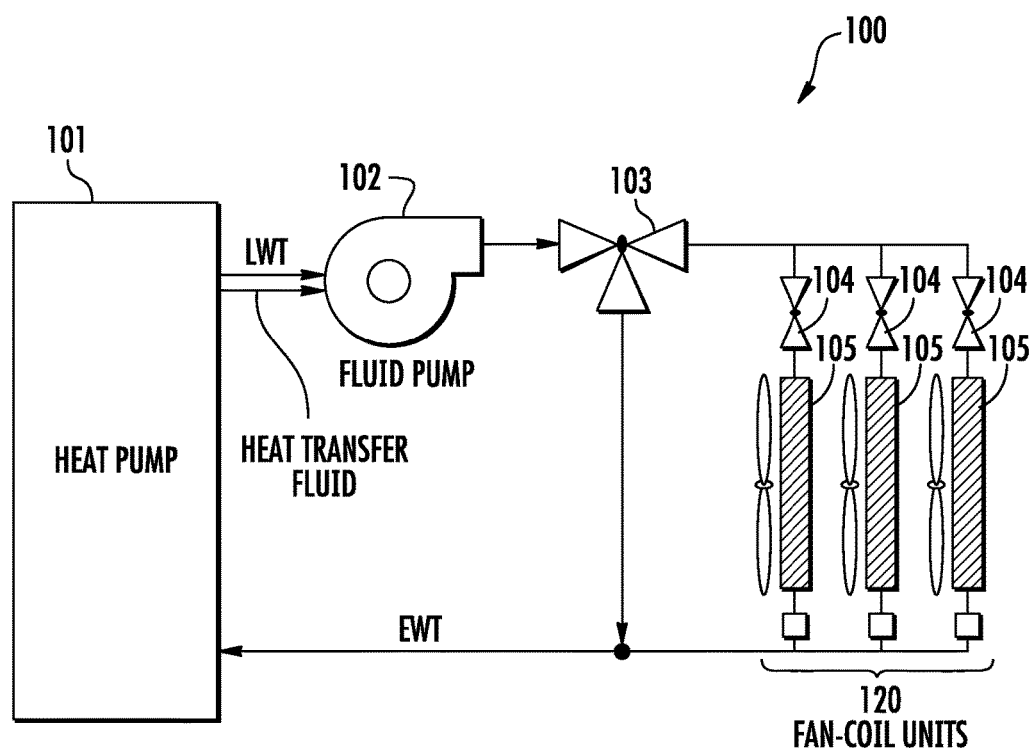
FIG. 1 depicts a convention HVAC system.
Figure 2:
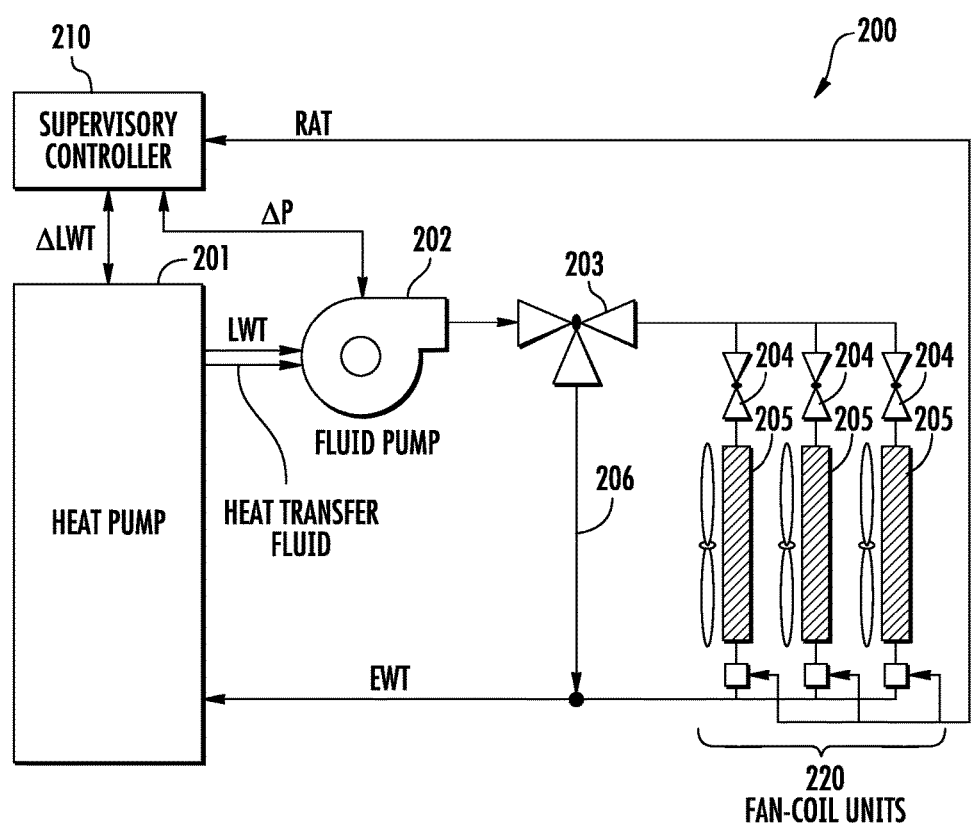
FIG. 2 depicts a HVAC system, according to an exemplary embodiment.

Turning to FIG. 2, an exemplary HVAC system 200 is depicted. The HVAC system includes heat pump 201. The heat pump 201 may be any suitable heat pump configured to exchange heat with an energy reservoir, for example, an external air source or water source. The system 200 further includes fluid pump 202 in fluid communication with the heat pump 201. As shown, the heat pump 201 provides a heat transfer fluid at a configured LWT to the fluid pump 202 for distribution throughout the system 200. The distribution is facilitated with three-way valve 203, which is arranged in fluid communication with both the fluid pump 202 and the heat pump 201.

As further illustrated, the system 200 includes a plurality of local fan-coil units 220 in fluid communication with the three-way valve 203 and the heat pump 201. Each fan-coil unit of the plurality of fan-coil units 220 includes at least a fluid valve 204 and a fan-coil heat exchanger 205.

As further illustrated, the system 200 includes supervisory controller 210 in signal communication with the heat pump 201, the fluid pump 202, and each fan-coil unit of the plurality of fan-coil units 220. Each fan-coil unit of the plurality of fan-coil units is arranged to provide conditioned air or fluid to a conditioned space. Furthermore, each fan-coil unit of the plurality of fan-coil units is configured to provide feedback information associated with a respective valve's position and conditioned space's return air temperature (RAT) to the supervisory controller 210.

The supervisory controller 210 is configured to process information received from each fan-coil unit to determine an appropriate ΔLWT and Δp. Further, the supervisory controller may be embodied as a processing apparatus, computer processor, or any other programmable processing device configured to perform method of HVAC system control as described herein, including processing of the ΔLWT and Δp values. The ΔLWT and Δp values are provided to the heat pump 201 and the fluid pump 202, or are added to default values and provided to the heat pump 201 and fluid pump 202.

Figure 3:
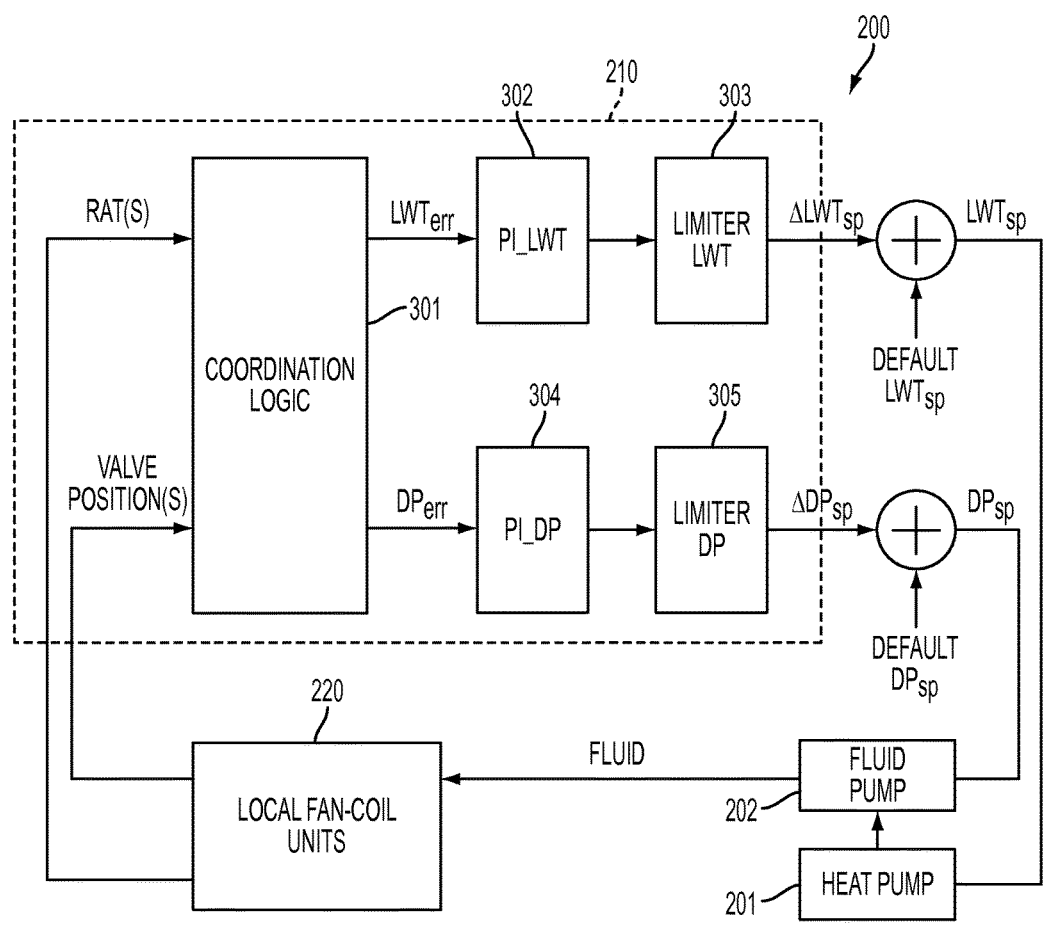
FIG. 3 depicts a control schematic of a HVAC system, according to an exemplary embodiment.

Turning to FIG. 3, control logic associated with the supervisory controller 210 and the HVAC system 200 is illustrated in more detail. As shown, the controller 210 includes coordination logic 301 configured to process RAT and valve position information from local fan-coil units 220. The RAT and valve position information is processed to determine if a LWT and/or DP error exists, or more clearly, if an adjustment to the LWT of the heat pump and/or the DP of the fluid pump is desirable.

Figure 4:
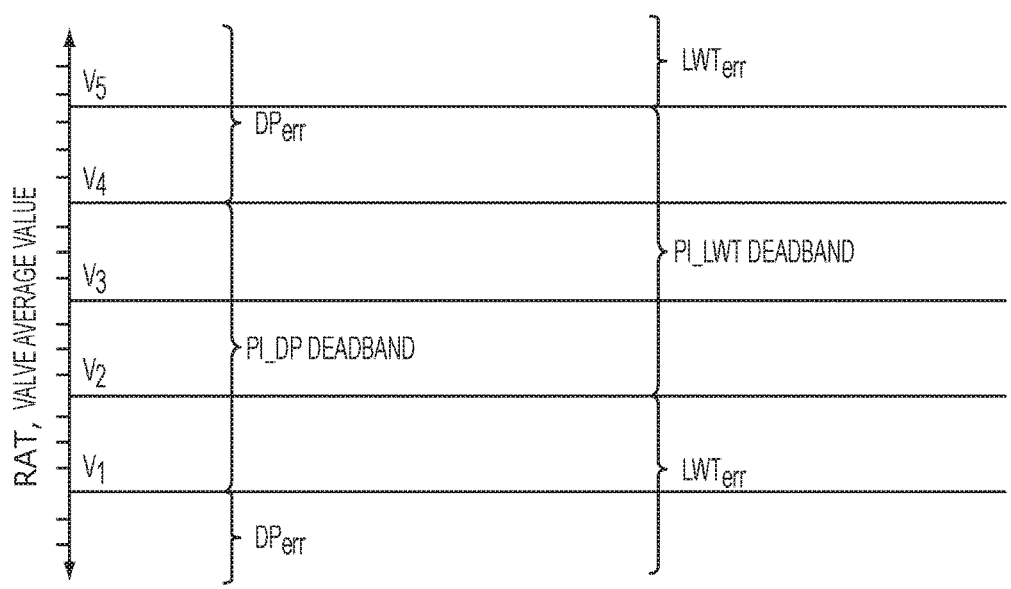
FIG. 4 depicts a dead-band coordination scheme for a HVAC system, according to an exemplary embodiment.

For example, as illustrated in FIG. 4, if an average value of valve position and/or RAT taken across the fan-coil units 220 exceed upper or lower bounds of associated DP and LWT dead-bands, an error or other suitable signal is provided to proportional integral derivative (PID) controllers 302 and 304. In each local FCU, a coordination map between a valve and fan may be pre-defined and the valve is used to control RAT. Therefore, valve opening and RAT information may be considered a load indicator for a local zone. If valve opening (e.g., position) and RAT information is taken as a weighted average across all fan-coil units, appropriate dead-bands may be determined and used to coordinate the error signals.

For example, a valve target set-point may be set as $V_3$ for the HVAC system. Further, a $V_1$-$V_4$ dead-band may be appropriate for PI_DP controller 304 and a $V_2$-$V_5$ dead-band may be appropriate for PI_LWT controller 302. Outside of the dead-bands, the PI_DP controller 304 and the PI_LWT controller 302 may receive associated error signals $DP_{err}$ and $LWT_{err}$. Although illustrated as a particular range of averaged values $V_1$-$V_5$, it should be understood that any appropriate values may be equally suitable according to any HVAC system implementation.

In response to receipt of an associated error signal, the PID controllers 302 and 304 process the error signals to determine an appropriate or desirable change in LWT and/or DP settings for the HVAC system 200.

The change in LWT and/or DP settings may be limited by associated limiters 303 and 305 to maximum/minimum values and combined with default set-points to create new set-points for the HVAC system 200. The new set-points are subsequently provided to the heat pump 201 and fluid pump 202. Alternatively, limiters 303 and 305 may be omitted with appropriately limited values being provided directly from controllers 302 and 304.

As an example, in cooling mode, a desirable $\Delta LWT_{sp}$ (e.g., set point) may be within 0~α1° C., where α1 is a positive number, for example, α1=3. Therefore, if a default $LWT_{sp}$=7° C., $LWT_{sp}$ will be floating within 7~7+α1° C. based on different cooling loads. Similarly, a desirable $\Delta P_{sp}$ (e.g., set point) may be within −β~0 kPa, where β is a positive number, for example, β=50. Therefore, if a default $DP_{sp}$=100 kPa, $DP_{sp}$ will be floating within 100−β ~100 kPa based on different loads. As a further example, in heating mode, a desirable $\Delta LWT_{sp}$ may be within −α2~0° C., where α2 is a positive number, for example, α2=5. Therefore, if a default $LWT_{sp}$=45° C., $LWT_{sp}$ in heating mode will be floating within 45−α2~45° C. based on different heating loads.

Figure 5:
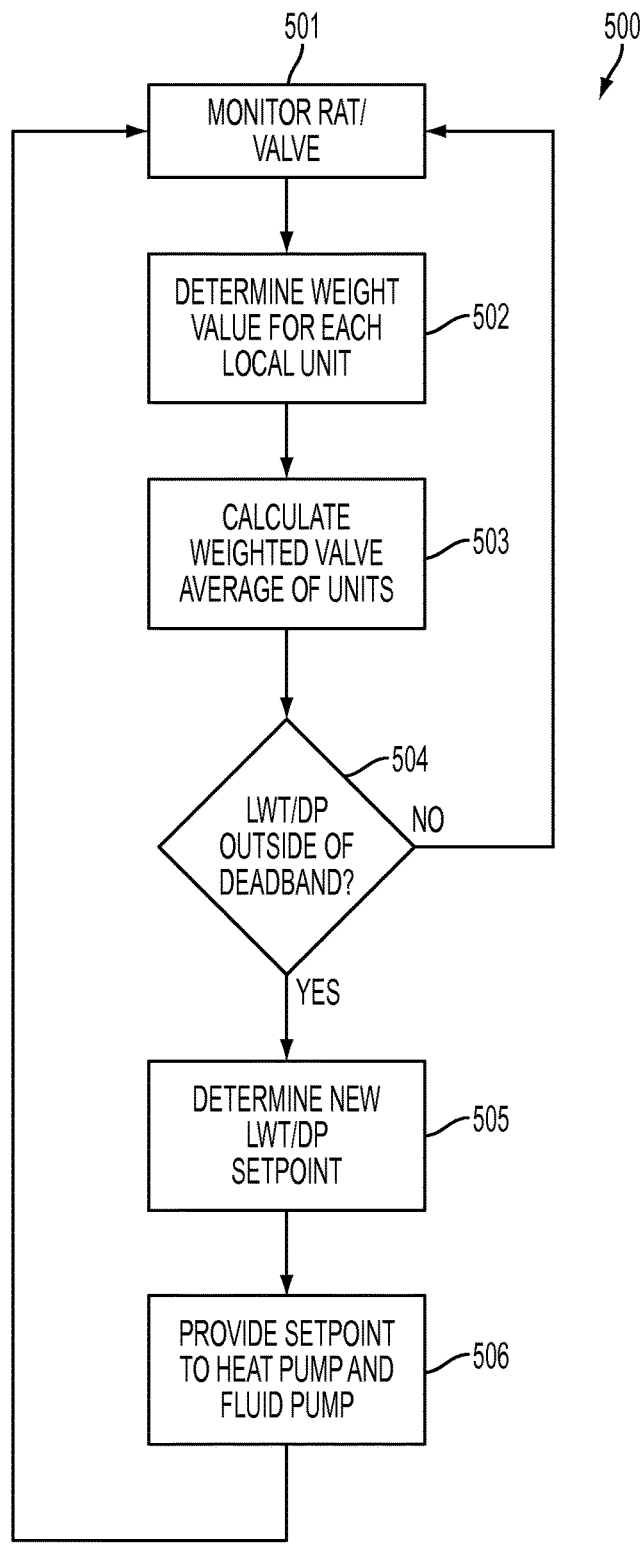
FIG. 5 depicts a method of control of a HVAC system, according to an exemplary embodiment.

Turning to FIG. 5, a method of control of the HVAC system 200 is provided. The method 500 may be processed by the supervisory controller 210 according to the schematic control scheme illustrated in FIGS. 3-4.

The method 500 includes monitoring RAT and valve information from the fan-coil units 220, at block 501. The method 500 further includes determining a weighted value for each fan-coil unit based upon the RAT and valve information at block 502. The weighted values are determined according to Table 1, provided below:

TABLE 1

```
for (i <= N){
    if (valvePosition[i] > valveThreshold and RAT_err[i]
    >= lowThreshold and RAT_err[i] <
    =mediumThreshold)
    {
        weight[i] = 1 + (RAT_err[l] − lowThreshold)*w1;
    }//endif
    elseif (valvePosition[i] > valveThreshold and
RAT_err[i] > mediumThreshold and RAT_err[i] <= highThreshold)
    {
        weight[i] = Constant + lowThreshold*w1 +
        (RAT_err[i] − mediumThreshold)*w2;
    }//endif
    elseif (valvePosition [i] >
valveThreshold and RAT_err[i] > highThreshold)
    {
        weight[i] = Constant + lowThreshold*w1 +
mediumThreshold*w2 + (RAT_err[l] − highThreshold)*w3;
    }//endif
    else {
        weight[i] = Constant;
    }//endelse
}//end for;
```

In Table 1, N is the number of FCUs, RAT_err is a variance in RAT from an associated target RAT. Further, w1, w2, w3 are predetermined weight values chosen based on increasing error. Moreover, the Constant may be any appropriate base integer suitable for a range of weighted values. Thereafter, the method 500 includes calculating a weighted valve average for the fan-coil units based upon the weighted values at block 503.

The weighted valve average value, according to a particular exemplary embodiment, may be determined according to Table 2, provided below:

TABLE 2

Weighted_valve_avg_meas=sum_{i=1:N}(weight(i)*val_pos(i))/N;

In Table 2, by taking into account RAT information in the weighted average value, the supervisory controller may actually consider comfort information such that enough cooling/heating capacity is provided.

Turning back to FIG. 5, if it is determined that the weighted valve average is outside of a dead-band (e.g., FIG. 4) at block 504, a new LWT and/or DP set-points are determined at block 505. Thereafter, the new set-points are provided to the heat pump 201 and fluid pump 202 at block 506, and the RAT and valve information are monitored again at block 501.

If the weighted average value is within a dead-band, the method 500 further monitors RAT and valve information at block 501.

Thus, as described above, exemplary embodiments of the present invention provide HVAC systems and associated control methods which enhance energy efficiency through real-time adjustment of heat pump and fluid pump set-points. LWT and DP set-points are adjusted based on an HVAC system's load. As particularly evident, energy savings are increased in partial loads, which consist of majority of operational time of HVAC systems.

It is noted that although particularly described as being associated with return air temperature and valve position, any other suitable variables in a HVAC system may be monitored to determine new set-points. Furthermore, although particularly described as being associated with fluid pressure and temperature set points, other adjustable variables including mass flow, air flow, or any other suitable set-point may be equally applicable to exemplary embodiments.

While the invention has been described in detail in connection with only a limited number of exemplary embodiments, it should be readily understood that the invention is not limited to such disclosed exemplary embodiments. Rather, the invention can be modified to incorporate any number of variations, alterations, substitutions or equivalent arrangements not heretofore described, but which are commensurate with the spirit and scope of the invention. Additionally, while various exemplary embodiments of the invention have been described, it is to be understood that aspects of the invention may include only some of the described exemplary embodiments. Accordingly, the invention is not to be seen as limited by the foregoing description, but is only limited by the scope of the appended claims.

The invention claimed is:

1. A system, comprising:
   a heat pump, wherein the heat pump is configured to match a heat transfer fluid temperature to a fluid temperature set-point;
   a fluid pump in fluid communication with the heat pump through heat transfer fluid, wherein the fluid pump is configured to match the heat transfer fluid pressure to a fluid pressure set-point;
   at least one heat exchanger in fluid communication with the fluid pump, wherein the at least one heat exchanger includes a proportional valve and a return air temperature gauge configured to monitor return air temperature associated therewith;
   a second heat exchanger in communication with the fluid pump, wherein the second heat exchanger includes a proportional valve and a return air temperature gauge configured to monitor return air temperature associated therewith;
   a supervisory controller in signal communication with the at least one heat exchanger, the fluid pump, and the heat pump, wherein the supervisory controller is configured to vary the fluid temperature set-point and vary the fluid pressure set-point based upon a position of the proportional valve and the return air temperature; and
   wherein the supervisory controller is configured to vary the fluid temperature set-point and vary the fluid pressure set-point based upon a weighted average value taken across all valve positions of each proportional valve of the heat exchangers and a weighted average value taken across all return air temperatures associated with the heat exchangers.

2. The system of claim 1, wherein the fluid temperature set-point is varied by the supervisory controller.

3. The system of claim 1, wherein the fluid pressure set-point is varied by the supervisory controller.

4. The system of claim 1, wherein the at least one heat exchanger is a fan-coil unit.

5. The system of claim 1, wherein the second heat exchanger is a fan-coil unit.

6. The system of claim 1, wherein the supervisory controller is a programmable processing apparatus configured to perform a method of HVAC system control, the method comprising:
   monitoring valve positions of each proportional valve of the plurality of heat exchangers;
   monitoring return air temperatures associated with each heat exchanger; and calculating a weighted average value across the monitored positions and calculating a weighted average value across the monitored return air temperatures.

7. The system of claim 6, wherein the method further comprises determining a weighted valve position value for each proportional valve of the heat exchangers and determining a weighted temperature value for each return air temperature associated with the heat exchangers, wherein the weighted average valve position value comprises an average of the weighted valve position values and the weighted average temperature value comprises an average of the weighted temperature values.

8. The system of claim 7, wherein the method further comprises determining if the weighted average value is outside of a dead-band range associated with an average target valve position, and, if the weighted average value is outside of the dead-band range, determining a new fluid temperature set-point and a new fluid pressure set-point based upon the weighted average value.

9. A system, comprising:
   a heat pump, wherein the heat pump is configured to match a heat transfer fluid temperature to a fluid temperature set-point;
   a fluid pump in fluid communication with the heat pump through the heat transfer fluid, wherein the fluid pump is configured to match the heat transfer fluid mass flow to a fluid mass flow set-point;
   at least one heat exchanger arranged in a conditioned space and in fluid communication with the fluid pump, wherein the at least one heat exchanger includes a proportional valve and an air temperature gauge configured to monitor air temperature of the conditioned space;
   a second heat exchanger in communication with the fluid pump, wherein the second heat exchanger includes a proportional valve and a return air temperature gauge configured to monitor return air temperature associated therewith:
   a supervisory controller in signal communication with the at least one heat exchanger, the fluid pump, and the heat pump, wherein the supervisory controller is configured to vary the fluid temperature set-point and vary the fluid mass flow set-point based upon a position of the proportional valve and the air temperature; and
   wherein the supervisory controller is configured to vary the fluid temperature set-point and vary the fluid pressure set-point based upon a weighted average value taken across all valve positions of each proportional valve of the heat exchangers and a weighted average value taken across all return air temperatures associated with the heat exchangers.

* * * * *